United States Patent [19]
Amagai et al.

[11] Patent Number: 5,748,933
[45] Date of Patent: May 5, 1998

[54] DATA DRIVEN TYPE INFORMATION PROCESSOR SUITABLE FOR IMAGE PROCESSING THAT UTILIZES A CONFIGURATION CONDITION

[75] Inventors: Takayuki Amagai, Yamatokouriyama; Tsuyoshi Muramatsu, Nara, both of Japan

[73] Assignee: Sharp Kabushiki Kaisha, Osaka, Japan

[21] Appl. No.: 463,767

[22] Filed: Jun. 5, 1995

[30] Foreign Application Priority Data

Aug. 31, 1994 [JP] Japan ................................. 6-206402

[51] Int. Cl.[6] ................................................. G06F 12/04
[52] U.S. Cl. ................................................. 395/377; 711/5
[58] Field of Search ................................. 395/800, 376, 395/377, 405, 410, 411

[56] References Cited

U.S. PATENT DOCUMENTS

| | | | |
|---|---|---|---|
| 5,072,377 | 12/1991 | Asai et al. | 395/421.06 |
| 5,327,125 | 7/1994 | Iwase et al. | 341/61 |
| 5,502,834 | 3/1996 | Arata et al. | 395/496 |
| 5,526,502 | 6/1996 | Yoshida et al. | 395/412 |
| 5,586,281 | 12/1996 | Miyama et al. | 395/405 |

OTHER PUBLICATIONS

"An Evaluation of Parallel–Processing in the Dynamic Data–Driven Processor", Hiroshi Kanekura et al., Microcomputer Architecture, Nov. 1991, pp. 9–18.

*Primary Examiner*—Tod R. Swann
*Assistant Examiner*—Christopher S. Chow

[57] ABSTRACT

Function processor FP of a data driven type information processor includes mechanism A receiving plural field generation number GN (representing pixel coordinate information), instruction code OPC, and condition X determining a divisional configuration of the generation number. Mechanism A takes out a bit field designated by instruction code OPC and/or the condition from applied generation number GN. Data of the taken out bit field is sent to arithmetic and logic unit A. Arithmetic and logic unit A carries out operation between data of the bit field and right data R-DATA. The operation result is sent to mechanism B. Mechanism B receives instruction code OPC, generation number GN, and condition X determining a divisional configuration of the generation number. The above described operation result is stored in the bit field of generation number GN designated by instruction code OPC and/or condition X.

22 Claims, 12 Drawing Sheets

| 4 | 10 | 10 |
|---|----|----|
| FD# | LN# | PX# |

| 3 | 10 | 11 |
|---|----|----|
| FD# | LN# | PX# |

| 2 | 11 | 11 |
|---|----|----|
| FD# | LN# | PX# |

| 12 | 12 |
|----|----|
| LN# | PX# |

FIG.4

| FD#<br>4 | LN#<br>10 | PX#<br>10 |
|---|---|---|

FD# : FIELD NUMBER FIELD
LN# : LINE NUMBER FIELD
PX# : PIXEL NUMBER FIELD
THE NUMBER INDICATES
THE NUMBER OF BITS IN
EACH FILED

* ITEM WHICH HAS LOST MEANING

FIG. 14 PRIOR ART

| FD# | LN# | PX# |
|-----|-----|-----|
| 2   | 10  | 12  |

FD#: FIELD NUMBER FIELD
LN#: LINE NUMBER FIELD
PX#: PIXEL NUMBER FIELD
THE NUMBER INDICATES
THE NUMBER OF BITS IN
EACH FILED

DATA DRIVEN TYPE INFORMATION PROCESSOR SUITABLE FOR IMAGE PROCESSING THAT UTILIZES A CONFIGURATION CONDITION

BACKGROUND OF THE INVENTION

1. Field of the Invention

The present invention relates to data driven type information processors, and more particularly, to a data driven type information processor capable of operating upon a generation number.

2. Description of the Related Art

In general, a data driven type information processor includes a Queue, Joint and Branch (QJB), a Firing Control (FC), a Program Storage (PS), and a Function Processor (FP). The data driven type information processor operates according to a simple rule that "when all the data needed for an action are available and resources such as an operation unit required for the action are assigned thereto, the action is carried out."

A packet processed in the data driven type information processor includes an instruction code, destination information, a generation number, left data, right data, and the like. The information matches data in the firing control through the queue, joint and branch, the instruction code is fetched in the program storage, and operation is carried out based on the instruction code in the function processor. The details of the data driven type information processor are described in "An Evaluation of Parallel-Processing in the Dynamic Data-Driven Processor" ("Microcomputer Architecture" Symposium, Japanese Society of Information Processing Engineers of Japan, pp. 9–18, November, 1991).

When an image is processed using the data driven type information processor, the generation number means coordinates of a picture element, and left data and right data mean a value and a parameter of the picture element. Further, the generation number is divided into a pixel number (X-coordinate) field, a line number (Y-coordinate) field, and a field number (Z-coordinate) field. The divisional configuration can be freely changed.

When an image is moved, magnified, reduced, rotated, and the like using the data driven type information processor for image processing, some operation must be performed on the generation number. Operation with the conventional technique will be described hereinafter by taking the case where three is added to the pixel number field as an example.

Figure 10:
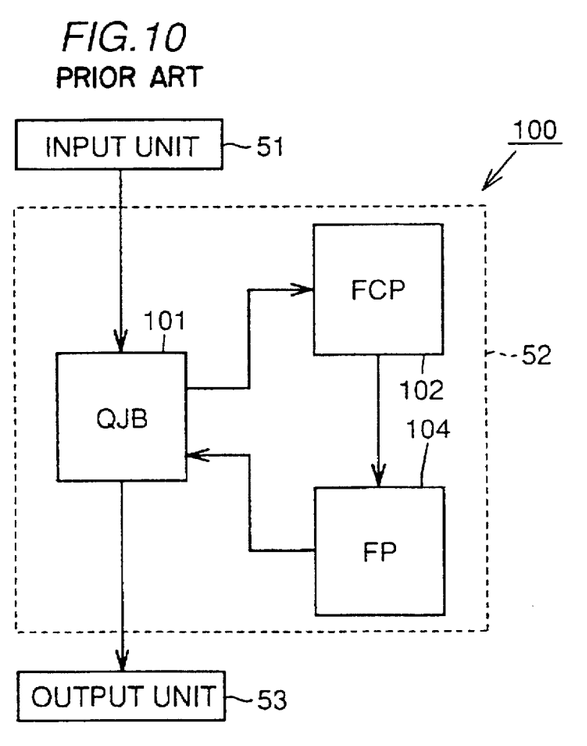
FIG. 10 is a block diagram showing a configuration of the data driven type information processor.

FIG. 10 is a block diagram showing a schematic configuration of a data driven type information processor 100. Referring to FIG. 10, data driven type information processor 100 includes an input unit 51, a data drive engine unit 52, and an output unit 53. Data drive engine unit 52 includes a QJB 101 receiving a packet, an FCP 102 connected to QJB 101 and matching data, and an FP 104 connected to FCP 102 and QJB 101 and carrying out operation of a data packet. Assume that a program and data required for data processing are already stored in QJB 101 and FCP 102.

Figure 11:
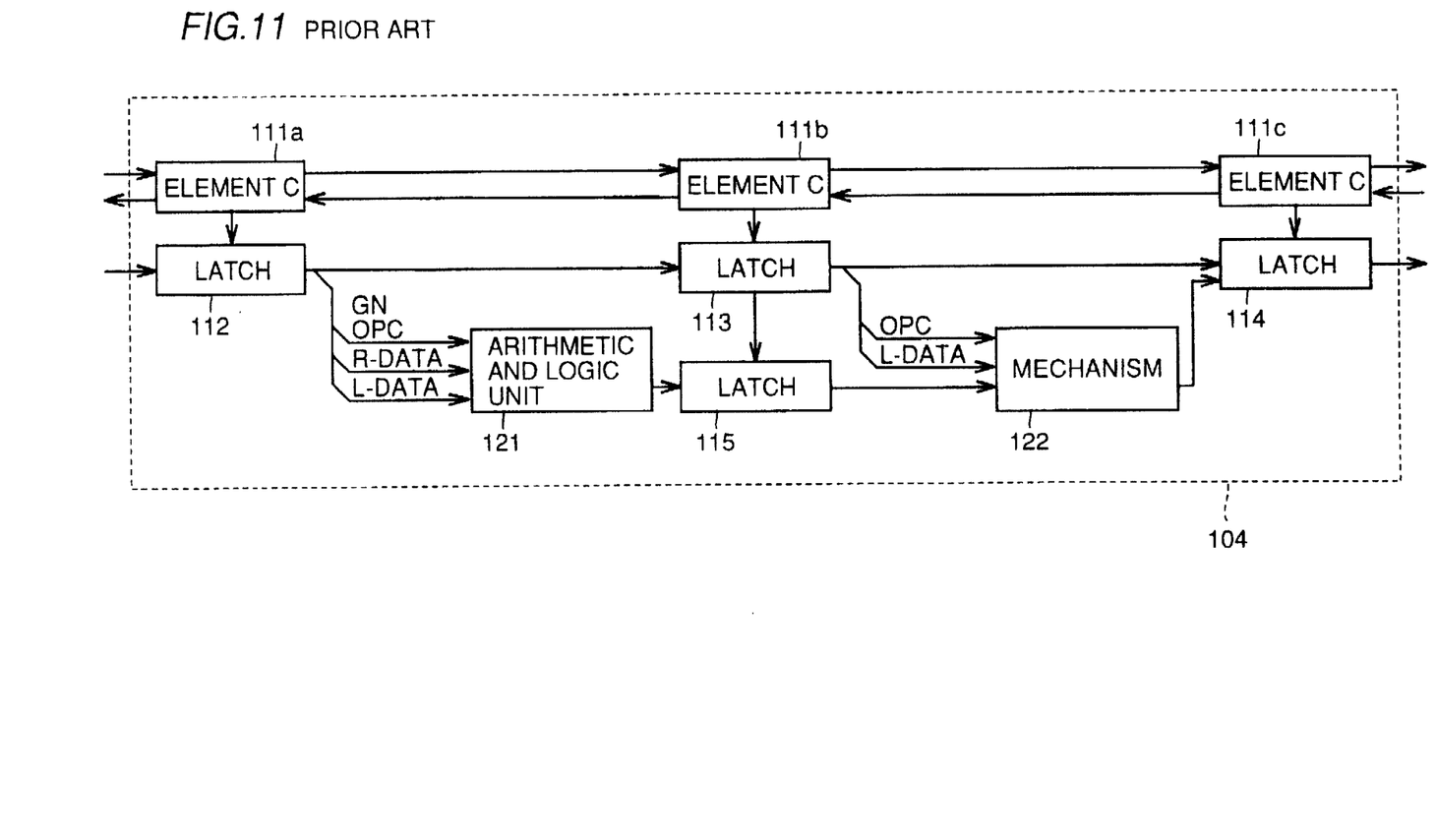
FIG. 11 is a block diagram showing a configuration of a conventional function processor.

FIG. 11 is a block diagram showing the details of FP 104 of FIG. 10. Referring to FIG. 11, FP 104 includes cascade-connected packet transfer control circuits (each hereinafter referred to as a "C element") 111a to 111c, latches 112 to 114 connected to C elements 111a to 111c, respectively, an arithmetic and logic unit 121 connected to latch 112 and receiving an instruction code (OPC), right data (R-Data), and left data (L-Data), a latch 115 latching an output from arithmetic and logic unit 121, and a mechanism 122 receiving an output from latch 115, and an instruction code (OPC) and left data (L-Data) from latch 113. An output from mechanism 122 is input to latch 114.

The C elements carry out transfer of packets under the following control. More specifically, when the C element at this stage receives a transfer allow signal indicating that the C element at the succeeding stage does not hold a packet, the C element at this stage outputs a latch pulse to a corresponding latch. At the same time, the C element at this stage outputs a transfer request signal to the C element at the succeeding stage, and outputs a transfer allow signal to the C element at the previous stage. When the C element at this stage receives a transfer request signal from the C element at the previous stage with the C element at the succeeding stage holding a packet, the C element at this stage holds a packet.

Figure 12:
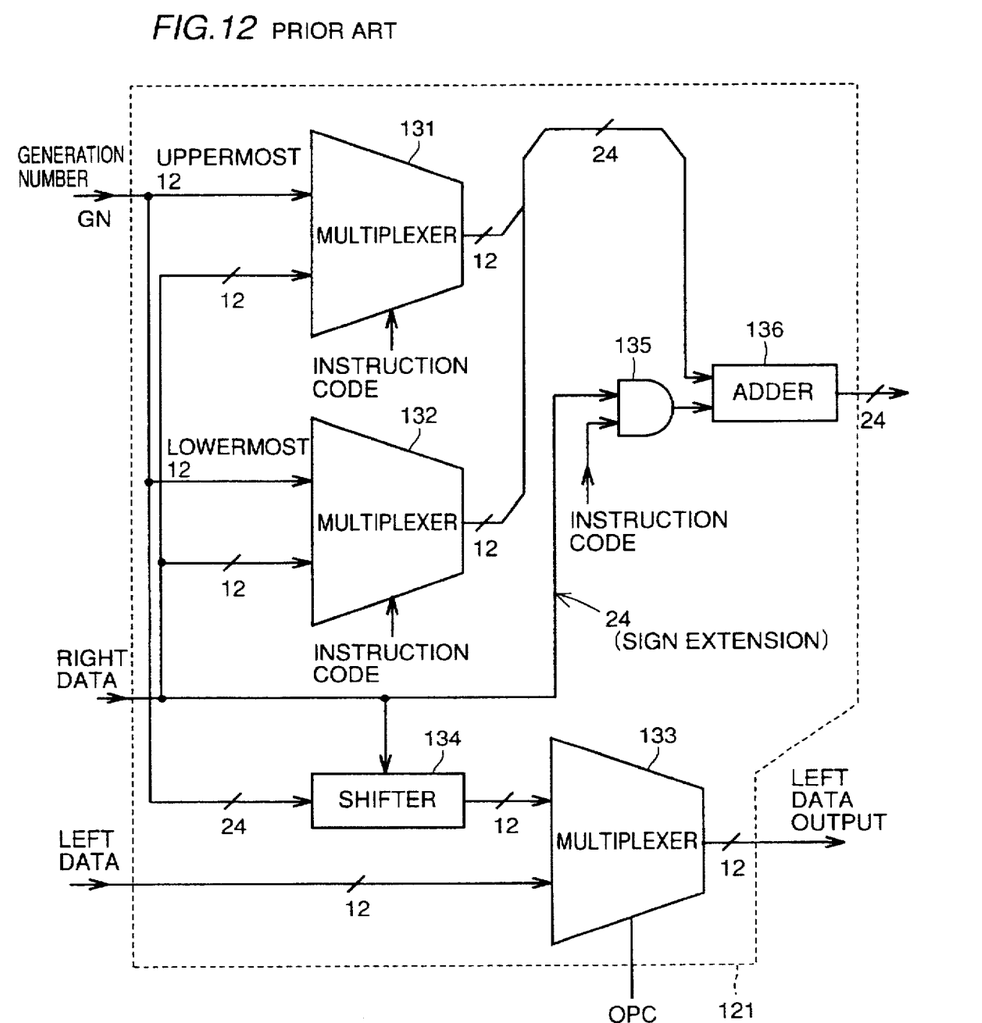
FIG. 12 is a block diagram showing a configuration of a conventional arithmetic and logic unit.

FIG. 12 is a block diagram showing the internal configuration of arithmetic and logic unit 121 shown in FIG. 11. Referring to FIG. 12, arithmetic and logic unit 121 includes multiplexers 131 and 132 each receiving a generation number GN, right data R-DATA, and instruction code OPC, a shifter 134 receiving generation number GN and right data R-DATA, a multiplexer 133 receiving data from shifter 134 and left data L-DATA, and an adder 136 receiving data from multiplexers 131 and 132 and an instruction code through an AND circuit 135. Left data L-DATA is output from multiplexer 133, and generation number GN is output from adder 136. Note that the numbers in the figure each denote the number of bits of each data.

Figure 13:
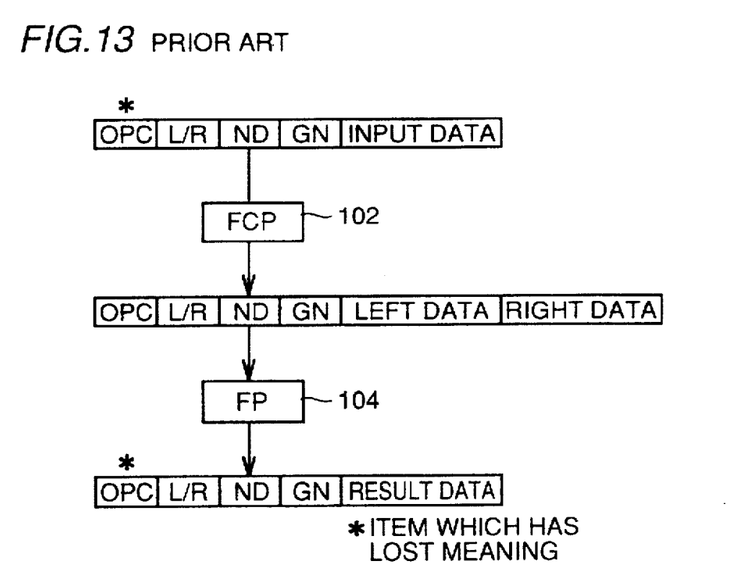
FIG. 13 is a diagram showing a configuration of data input or output to each component in the data driven type information processor.

Referring to FIGS. 10 to 12, operation in a conventional data driven type information processor will be described. FIG. 13 is a schematic diagram showing a structure of a data packet to be applied to QJB 101. Referring to FIG. 13, a data packet to be applied includes instruction code OPC, a flag L/R determining whether input data DATA is left data L-DATA or right data R-DATA, a node number ND, generation number GN, and input data DATA. Although all the information items are always included as data in a packet actually, only significant information items will be described hereinafter for simplicity of explanation. Note that FCP 102 refers to flag L/R, node number ND, and generation number GN, and FP 104 refers to instruction code OPC, left data L-DATA, and right data R-DATA. The difference between an input format and an output format of FCP 102 is only the presence or absence of right data R-DATA, as shown in FIG. 13.

QJB 101 checks the third bit from the lowermost bit of node number ND of the applied packet. QJB 101 sends the packet to FCP 102 if the third bit is 0, and directly outputs the packet if the third bit is 1.

Figure 14:
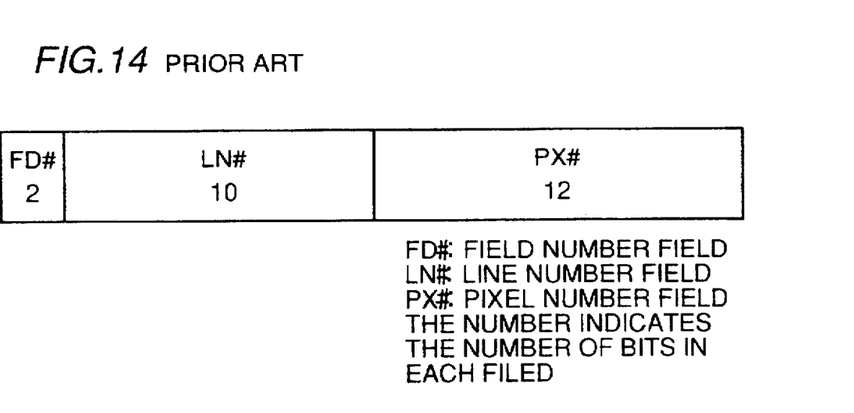
FIG. 14 is a diagram showing a configuration of a generation number.

FIG. 14 is a diagram showing the details of generation number GN. Referring to FIG. 14, generation number GN has 24 bits, with the field divided into two bits of a field number field FD#, 10 bits of a line number field LN#, and 12 bits of a pixel number field PX# from the uppermost bit.

Assume that a packet to be applied now has node number ND=000 (binary), generation number GN=5 (decimal) (FD#=0, LN#=0, PX#=5), DATA=0(decimal), and flag L/R= L.

Figure 15:
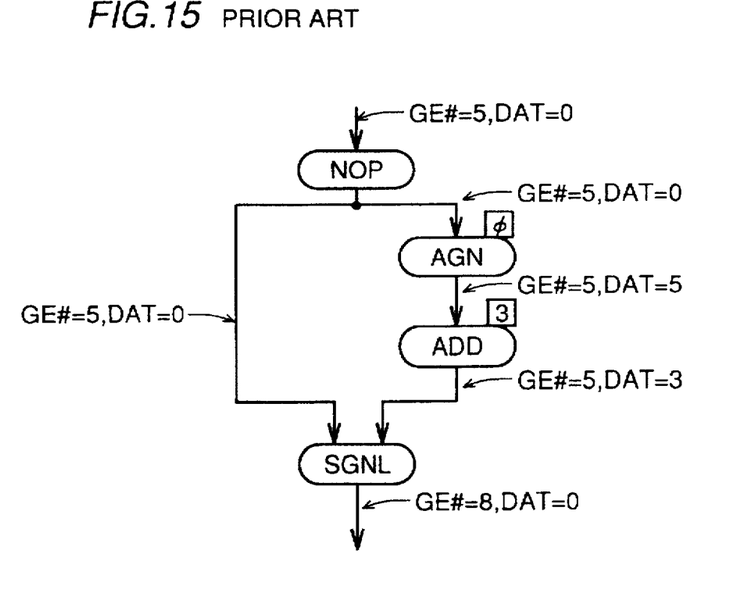
FIG. 15 is a data flow graph showing conventional operation of the data driven type information processor.

FIG. 15 is a data flow graph indicating the contents of the above processing. Referring to FIG. 15, the contents of processing will be described hereinafter. Note that, in the figure, GE# denotes generation number GN, and DAT denotes a data value. The packet described above is applied to QJB 101. QJB 101 checks the third bit from the lowermost bit of node number ND. Since the third bit is 0, QJB 101 sends the packet to FCP 102. Because of node number ND=000, FCP 102 sends two packets to FP 104 without matching of data. More specifically, if the applied packet fetches a program in FCP 102, and an instruction bit to "copy" is set in the program word, FCP 102 generates a copy of the packet after fetching the program only different in a destination node number, and outputs two packets. The two packets include a packet of instruction code OPC=NOP, node number ND=011, generation number GN=5, and left data L-DATA=0, and a packet of instruction code OPC= NOP, node number ND=001, generation number GN=5, and left data L-DATA=0. Note that NOP (No Operation) is an instruction to perform no processing to an input packet.

FP 104 sends the two packets to QJB 101 without any processing, and QJB 101 sends the packets to FCP 102 since the third bit from the lowermost bit of node number ND is 0. The packet of node number ND=011 is in a wait state until arrival of right data. On the other hand, when one operand of a two-operand instruction is a constant, as part of a program, the constant is loaded in FCP 102 as paired data which has already arrived. Therefore, when searching for paired data, the packet of node number ND=001 detects the constant as paired data which has already arrived. FCP 102 sends the paired data as a packet of instruction code OPC= AGN, node number ND=010, generation number GN=5, left data L-DATA=0 and right data R-DATA=0 to FP 104. Here, AGN (Assign Generation Number) means to right-shift data by the number attached to the right shoulder in a generation number symbol of the input packet, and to take out the right-shifted data as an output value. Therefore, FP 104 right-shifts generation number GN by 0. More specifically, FP 104 sets the lower 12 bits of generation number GN in a data region (result data region of FIG. 3) (the lower 12 bits of generation number GN are used as a pixel number field), and sends a packet of node number ND=010, generation number GN=5, DATA=5, and flag L/R=L to QJB 101. QJB 101 sends the packet to FCP 102. Since three is stored in FCP 102 as its right data, FCP 102 sends the right data to FP 104 as a packet of instruction code OPC=ADD, node number ND=011, generation number GN =5, left data L-DATA=5, and right data R-DATA=3. Here, ADD is an instruction to carry out addition of two input values and to output the result. Therefore, FP 104 adds the input values. More specifically, FP 104 sets an addition result of left data L-DATA and right data R-DATA in a DATA region. Then, FP 104 sends a packet of node number ND=011, generation number GN=5, DATA=8, and flag L/R=R to QJB 101. QJB 101 sends the packet to FCP 102. Here, node number ND=011, left data of generation number GN=5, and right data are available. FCP 102 sends a packet of instruction code OPC=SGNL, node number ND=100, generation number GN=5, left data L-DATA=0, and right data R-DATA=8 to FP 104. Here, SGNL (Set Generation Number Low) is an instruction to set right input data in a lower region of a generation number GN region in the packet and to directly output left input data. The reason why the right input data is set in the lower region is that the generation number GN width (24 bits here) is exactly twice as large as the data width (12 bits here).

Therefore, FP 104 sets right data R-DATA in the lower 12 bits of generation number GN, and sends a packet of node number ND=100, generation number GN=8, DATA=0, and flag L/R=L to QJB 101. QJB 101 outputs the packet. Generation number GN=8 means FD#=0, LN#=0, and PX#= 8. It is found that three is added to PX#. Other than that, it is found that, in the conventional technique, operation cannot be performed to generation number GN without using a data region in the course of the operation, thereby requiring a large number of nodes for the contents of the operation. Here, the number of nodes is the number of the nodes such as the above described AGN when necessary processing is represented in a data flow graph. The number of nodes is approximately equivalent to the number of program steps or program words in a conventional microcomputer.

Figure 16:
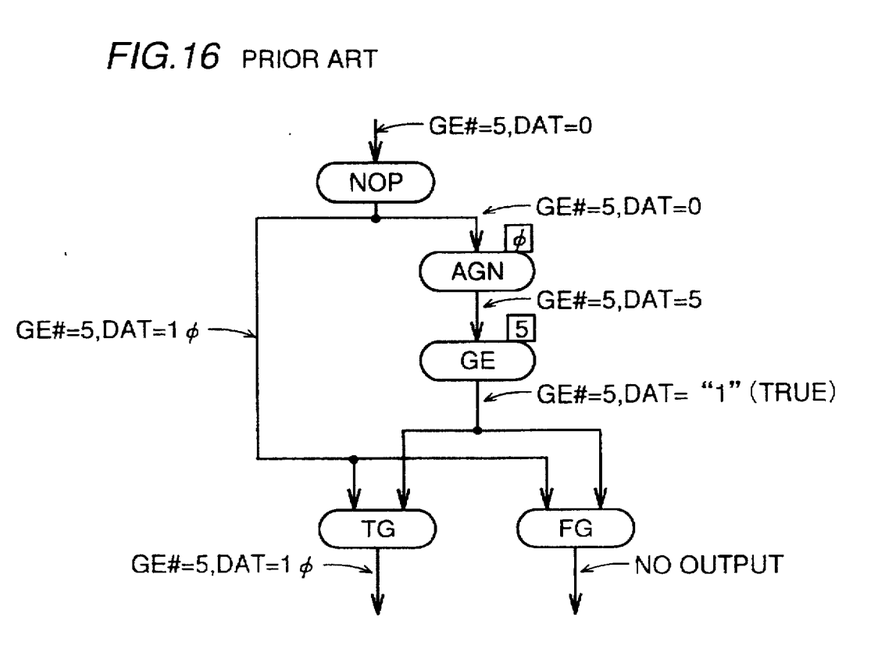
FIG. 16 is a data flow graph showing the conventional operation of the data driven type information processor.

Consider the case where different processings are carried out depending on a value of generation number GN in the conventional technique. Take as an example the case where different processings are carried out depending on whether pixel number field PX being at least five or less than five. FIG. 16 is a data flow graph showing this case. Assume that the field division is the same as the above described example. Referring to FIG. 16, first, two packets are copied (NOP). One packet is held without being processed at all in order to hold left data. In the other packet, only lower 12 bits of generation number GN used as the pixel number field are set as left data (AGN), and the left data is compared with five (GE). The data flow is branched based on a value (true or false) of the comparison result with the left data (TG or FG). Here, GE (Greater or Equal) is an instruction to output a true value ("1") if left input data ≧ right input data, and to output otherwise a false value ("0"). TG (True Gate) is an instruction to directly output left input data if right input data is a true value, and to discard (not output) left input data if right input data is a false value. Note that FG (False Gate) indicates the reverse of TG.

From the above description, it is found that the data region must be used in order to branch the data flow, and that a large number of nodes is therefore required for the content of operation.

When an image is processed, a value of a pixel element is placed in a data region of a packet which the data driven type information processor processes. When it is desired to perform operation to a specific field of generation number GN using the conventional technique, the data region must be inevitably used as described above, which increases the number of nodes. Further, when different processings are carried out depending on the value of generation number GN, the similar problem arises.

SUMMARY OF THE INVENTION

One object of the present invention is to provide a data driven type information processor capable of performing operation to a specific field of a generation number with a small number of nodes.

Another object of the present invention is to provide a data flow type information processor capable of branching a data flow based on a generation number with a small number of nodes. The above objects of the present invention are achieved by a data driven type information processor including the following components.

More specifically, the data driven type information processor according to the present invention receives data having a generation number for data mutual identification attached, an instruction code, and a condition based on which a divisional configuration of the generation number is determined. The data driven type information processor includes a unit for taking data out in a bit field designated based on the instruction code and the condition from the generation number, an operation unit for carrying out operation between the taken data in the bit field and operand data, and a unit for storing an operation result by the operation unit in the bit field of the generation number designated by the instruction code and the condition, whereby operation of the designated bit field of the generation number can be carried out.

Since operation can be carried out directly to a specific field of the generation number without using a data region, a data flow type information processor is provided which can reduce the number of nodes.

Preferably, the operation unit outputs a branch signal branching the subsequent processing according to the operation result.

Since the branch signal branching the subsequent processing is output from the operation unit according to the operation result, a data flow type information processor is provided which can branch the processing based on the generation number.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of the present invention will be described hereinafter with reference to the drawings. The data driven type information processor according to the present invention has a configuration basically the same as the conventional processor shown in FIG. 10, except for the configuration of FP 103. Therefore, FP 103 in the data driven type information processor according to the present invention will be described hereinafter.

For simplicity of description, a mechanism for taking out a bit field designated by instruction code OPC and/or a condition from generation number GN is referred to as mechanism A, an arithmetic and logic unit carrying out operation between the bit field and operand data is referred to as arithmetic and logic unit A, and a mechanism for storing the operation result in the bit field of generation number GN designated by instruction code OPC and/or the condition is referred to as mechanism B.

Figure 1:
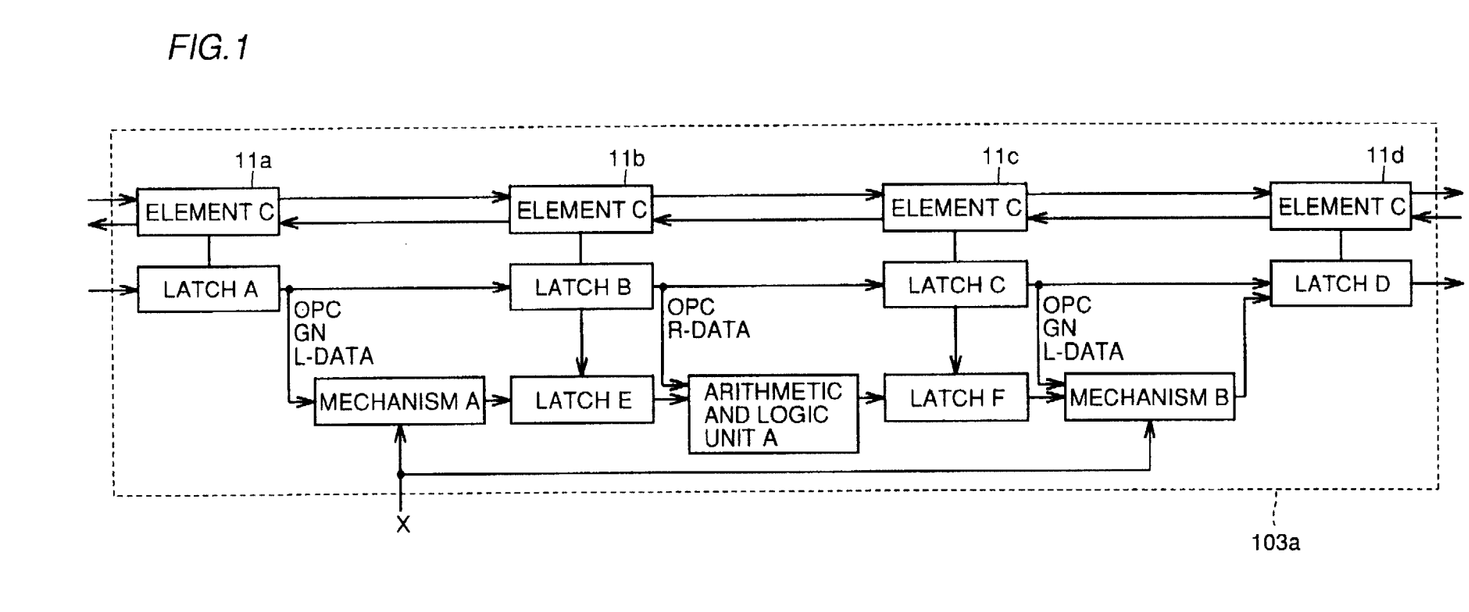
FIG. 1 is a block diagram of a function processor of the data driven type information processor according to a first embodiment of the present invention.

FIG. 1 is a block diagram showing the internal configuration of an FP 103a of the data driven type information processor according to the present invention. Referring to FIG. 1, FP 103a according to the present invention includes a plurality of C elements 11a to 11d, latches A to D connected to respective C elements, mechanism A connected to latch A and receiving instruction code OPC, generation number GN, left data L-DATA, and a condition X based on which a divisional configuration of generation number GN is determined, a latch E connected to mechanism A and latch B, arithmetic and logic unit A connected to latches B and E and receiving instruction code OPC and right data R-DATA, a latch F connected to latch C and arithmetic and logic unit A, and mechanism B receiving instruction code OPC, generation number GN, and left data L-DATA output from latch C, an output from latch F, and the condition based on which a divisional configuration of generation number GN is determined. An output from mechanism B is sent to QJB 101 via latch D.

Note that condition X based on which a divisional configuration of generation number GN is determined is designated by setting of terminals, setting of switches, setting of parameters to resistors, or the like.

Figure 2:
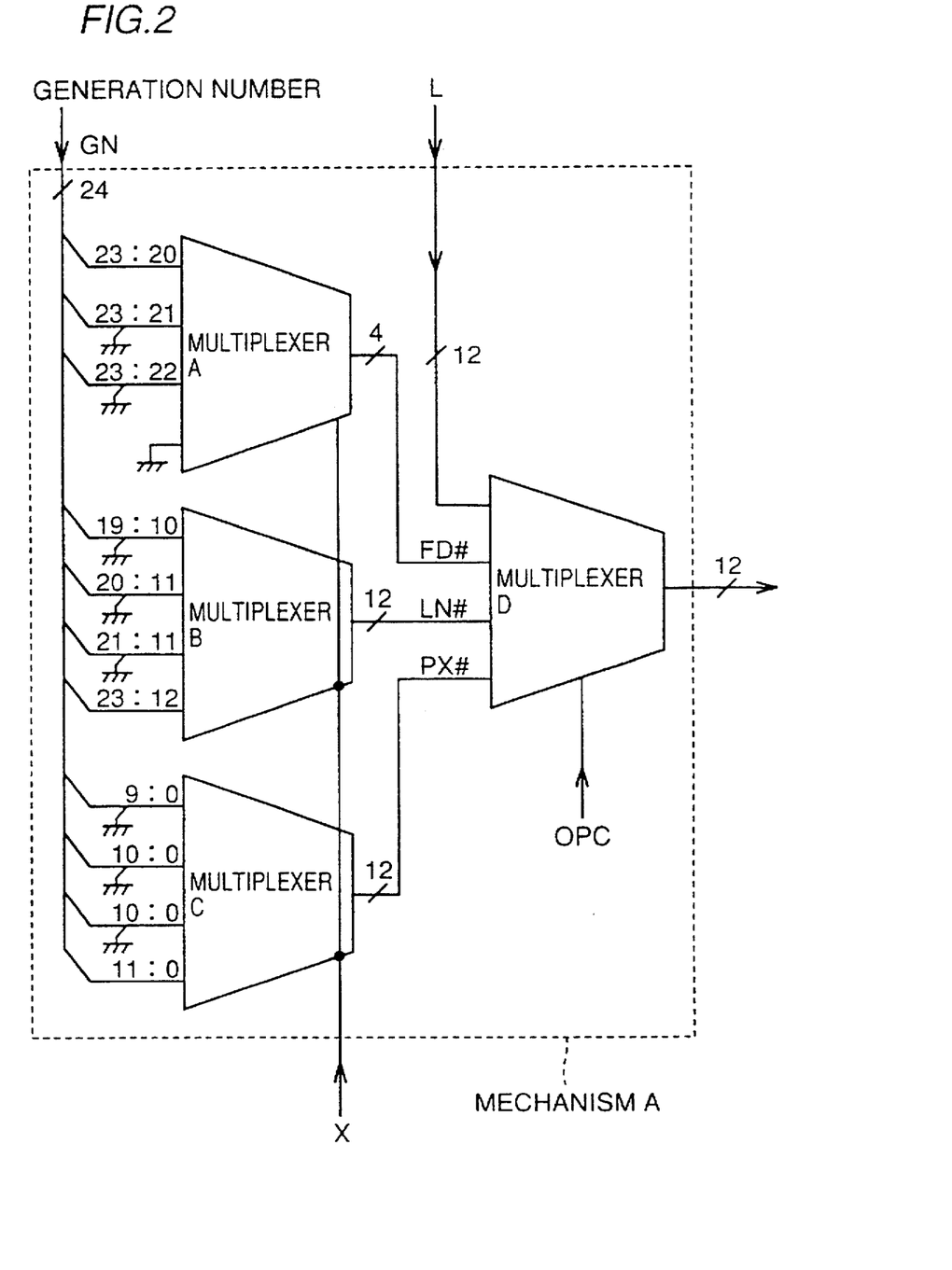
FIG. 2 is a block diagram of a mechanism A included in the function processor.

FIG. 2 is a block diagram showing the configuration of mechanism A. Referring to FIG. 2, mechanism A includes multiplexers A to C receiving 24-bit generation number GN and condition X based on which a divisional configuration of generation number GN is determined. Multiplexer A outputs 4-bit data from generation number GN as field number field FD# according to condition X based on which a divisional configuration of generation number GN is determined. Similarly, multiplexers B and C output 12-bit line number field LN# and pixel number field PX# to a multiplexer D according to condition X based on which a divisional configuration of generation number GN is determined. Multiplexer D receives 12-bit left data L-DATA and instruction code OPC in addition to data from generation number GN, and outputs 12-bit data.

Note that the number described at an input unit of each of multiplexers A to C indicates a bit field. For example, 9:0 input through the uppermost line of multiplexer C means that the generation number has a bit field of a 10-bit width from the 0-th bit (LSB) to the ninth bit.

Figure 3:
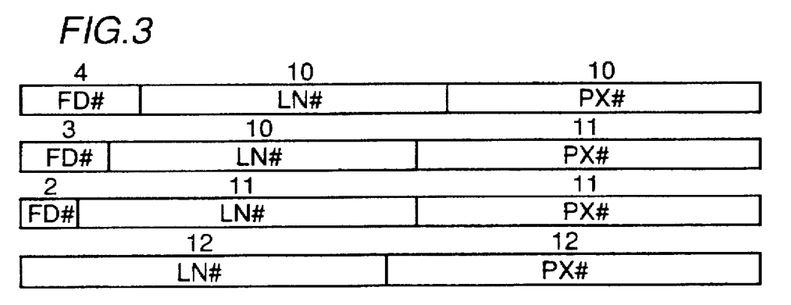
FIG. 3 is a diagram showing a state in which a divisional configuration of a generation number is changed.

FIG. 3 is a diagram showing the configuration of generation number GN input to mechanism A. As shown in FIG. 3, according to condition X based on which a divisional configuration of generation number GN is determined, field number field FD# changes from 0 to 4 bits, and line number field LN# and pixel number field PX# can change from 10 to 12 bits.

(1) First Embodiment

Referring to FIGS. 1 and 2, the case where three is added to pixel number field PX# in FP 103a of the data driven type information processor will be described as an example. This corresponds to shifting a pixel element in the X-axis direction by three dots in image processing.

Figure 4:
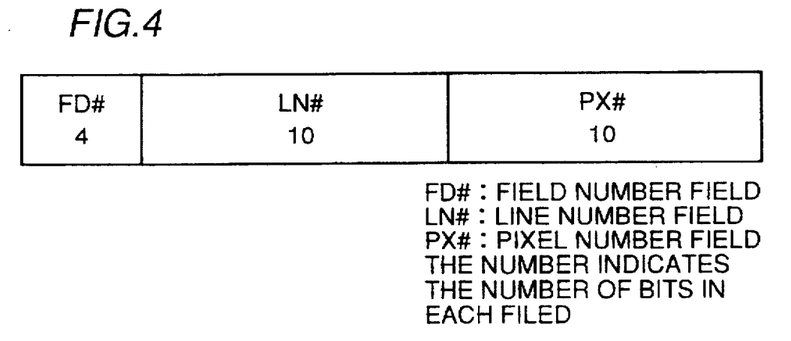
FIG. 4 is a diagram showing a configuration of a generation number input from an input unit.

Assume that necessary programs and data are already stored in QJB 101 and FCP 102 similar to the conventional example. QJB 101 checks the third bit from the lowermost bit of node number ND. If the third bit is 0, QJB 101 sends a packet to FCP 102, and if the third bit is 1, QJB 101 outputs the packet. The field of 24-bit generation number GN input from latch A is divided into four bits of field number field FD#, 10 bits of line number field LN#, and 10 bits of pixel number field PX# from the uppermost bit, as shown in FIG. 4. Further, assume that a packet to be applied has node number ND=000 (binary), generation number GN=5 (decimal) (FD#=0, LN#=0, PX#=5), DATA =0 (decimal), and flag L/R=L.

More specifically, the above described packet is first applied to QJB 101. QJB 101 checks the third bit from the lowermost bit of node number ND. Since the third bit is 0, QJB 101 sends the packet to FCP 102. In FCP 102, a constant "3" which is right data is loaded simultaneously with the program load. FCP 102 is waiting for paired data. Since the packet is input to FCP 102 in such a state, paired data is immediately generated in FCP 102. FCP 102 sends a packet of instruction code OPC=ADDPX, node number ND=100, generation number GN=5, L/DATA=0, and right data R-DATA=3 to FP 103a. Here, ADDPX is an instruction to add right input data to a value of pixel number field PX# in generation number GN, and to directly output left input data.

In FP 103a, instruction code OPC, generation number GN, and left data L-DATA of the applied data are input to mechanism A. In mechanism A, based on the data and condition X determining a divisional configuration of generation number GN, only pixel number field PX# of generation number GN is output to multiplexer D from multiplexer C. This is input to arithmetic and logic unit A through latch E at the next stage.

Figure 5:
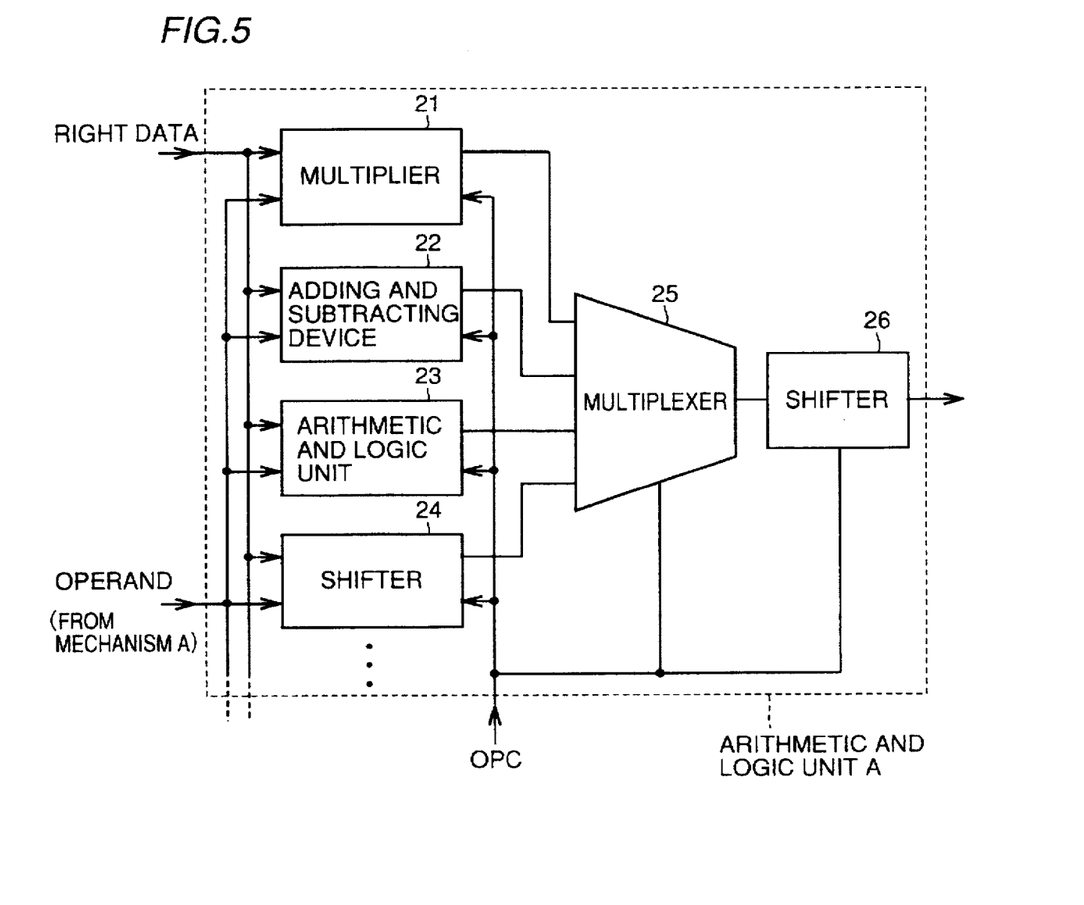
FIG. 5 is a block diagram of an arithmetic and logic unit A.

FIG. 5 is a block diagram showing the configuration of arithmetic and logic unit A. Referring to FIG. 5, arithmetic and logic unit A includes a multiplier 21, an adding and subtracting device 22, an arithmetic and logic unit 23, and a shifter 24 each capable of receiving right data, operand from mechanism A, and instruction code OPC. An output from multiplier 21 or the like is applied to a multiplexer 25, and provided to latch F through a shifter 26. Instruction code OPC for selection of data is input to multiplexer 25 and shifter 26.

Referring to FIG. 5, arithmetic and logic unit A receives the same instruction code OPC and right data R-DATA as described above for operand from mechanism A input through latch E. Only a value of pixel number field PX# plus right data R-DATA=3 is selected in multiplexer 25, and the value is output. This value is input to mechanism B through latch F at the next stage.

Figure 6:
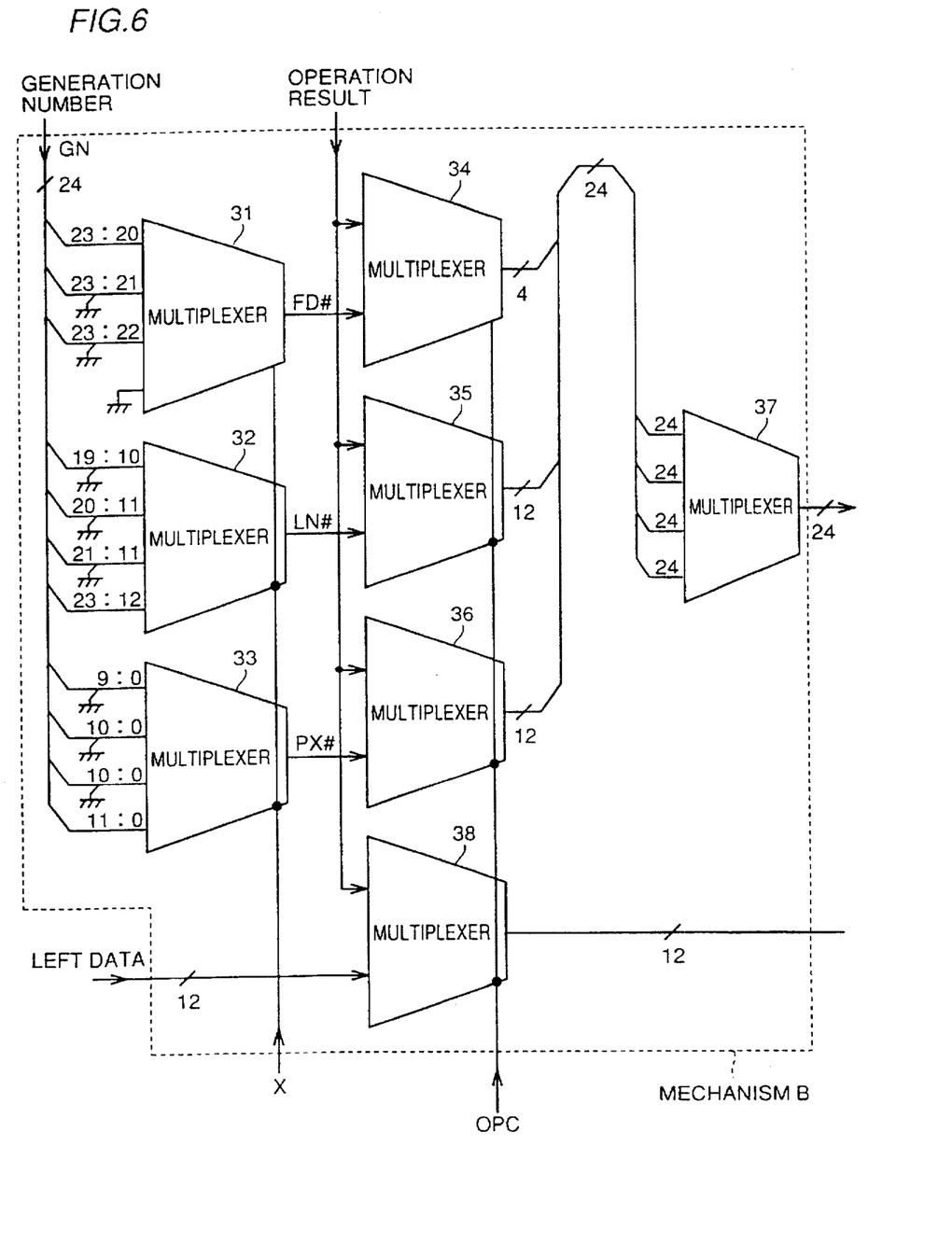
FIG. 6 is a block diagram of a mechanism B.

FIG. 6 is a block diagram showing the configuration of mechanism B. Referring to FIG. 6, mechanism B includes multiplexers 31 to 33 each receiving generation number GN and condition X determining a divisional configuration of generation number GN, multiplexers 34 to 36 receiving respective outputs from multiplexers 31 to 33, the operation result from arithmetic and logic unit A, and instruction code OPC, a multiplexer 37 selecting outputs from multiplexers 34 to 36, and a multiplexer 38 receiving left data L-DATA and the operation result. Four-bit field number field FD#, 12-bit line number field LN#, and 12-bit pixel number field PX# are output from multiplexers 31 to 33, respectively. Based on the above input, generation number GN of pixel number field PX# plus three and left data L-DATA (to which no operation is carried out) are output from mechanism B, and these values are synthesized with bits other than generation number GN and data DATA in latch D at the final stage. The output of latch D is the output of FP 103a, and a packet of node number ND=100, generation number GN=8, data DATA=0, and flag L/R=L is sent to QJB 101. Since the third bit from the lowermost bit of node number ND is 1, QJB 101 outputs the packet. Generation number GN=8 means field number field FD#=0, line number field LN#=0, and pixel number field PX#=8. It is found that three is added to pixel number field PX#. In addition, it is found from data DATA=0 and flag L/R=L that no operation is carried out to input data.

Figure 7A:
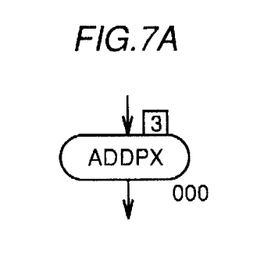
FIGS. 7A and 7B are a data flow graph of the first embodiment and a second embodiment.

FIG. 7A is a data flow graph indicating the content of the above described processing. Here, ADDPX (ADD Pixel Number) indicates an instruction to add right input data to a value of the pixel number field in the generation number, and to directly output left input data. Referring to FIG. 7A, it is found that the number of nodes is substantially reduced compared to the case where the conventional technique is used.

Other than this embodiment, as a field to which operation is carried out, any combination of field number field FD#, line number field LN#, and pixel number field PX# may be used. The content of operation includes, arithmetic operation, logic operation, bit shift, comparison, and the like.

(2) Second Embodiment

Figure 8:
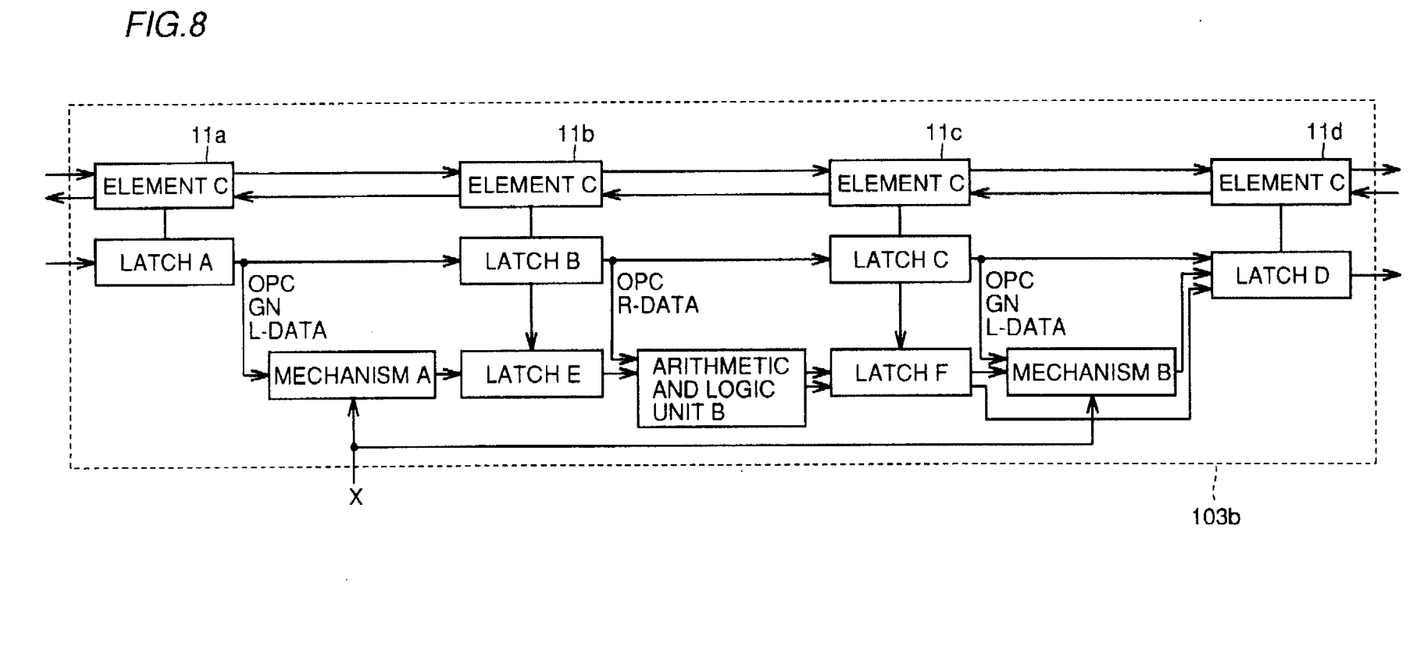
FIG. 8 is a block diagram of a function processor according to the second embodiment of the present invention.

FIG. 8 is a block diagram showing the configuration of an FP 103b according to the second embodiment of the present invention. FIG. 8 corresponds to FIG. 1 of the first embodiment. In the second embodiment, the basic configuration is the same as that of the first embodiment. The same components are labeled with the same reference characters, and the description thereof will not be repeated.

The second embodiment is different from the first embodiment in that the arithmetic and logic unit operating data of the bit field input through latch E from mechanism A is replaced with an arithmetic and logic unit B. Arithmetic and logic unit B carries out operation between the bit field designated based on instruction code OPC and/or condition X from generation number GN and operand data, and generates an identification signal for branch.

Description will be given of the case where "it is desired to carry out different processings depending on whether the value of pixel number field PX# being at least five or less than five" with the circuit of FIG. 8 applied to FP 103 of the data driven type information processor. Also in this case, assume that the basic condition such as the condition under which packet processing of QJB 101 is carried out, the packet field division (FIG. 4), and the like are the same as those of the first embodiment.

Assume that a packet to be applied has node number ND =000(binary), generation number GN=8(decimal) (FD#=0, LN#=0, PX#=8), data DATA=0(decimal), and flag L/R=L. The above described packet is applied to QJB 101. QJB 101 checks the third bit from the lowermost bit of node number ND. Since the third bit is 0, QJB 101 sends the packet to FCP 102. Since right and left data of node number ND=000 are available, FCP 102 sends a packet of instruction code OPC=SWGEPX (Switch Greater or Equal Pixel Number), node number ND=100, generation number GN=8, left data L-DATA=0, and right data R-DATA=5 to FP 103b. Here, in FIG. 7B, SWGEPX is an instruction to compare the magnitude of pixel number field PX# and operand data. When the value of pixel number field PX# in generation number GN is larger than or equal to right input data R-DATA, left input data L-DATA is output as the left output data. Otherwise, the left input data L-DATA is output as the right output data.

In FP 103b, instruction code OPC, node number ND, and left data L-DATA of the applied data are input to mechanism A through latch A as shown in FIG. 8. In mechanism A, only pixel number field PX# of generation number GN is output from multiplexer D (cf. FIG. 2) based on the data and the above described condition X determining a divisional configuration of generation number GN. This is applied to arithmetic and logic unit B through latch E at the next stage.

Figure 9:
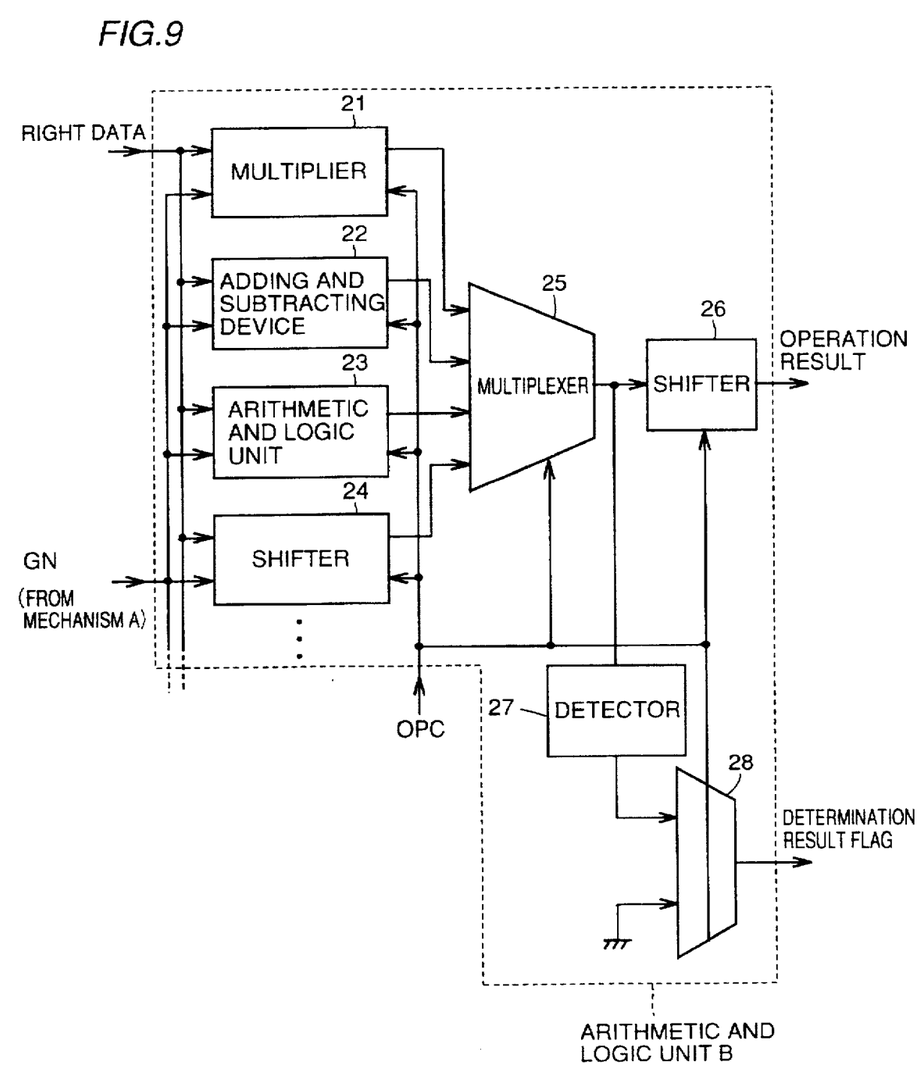
FIG. 9 is a block diagram showing a configuration of an arithmetic and logic unit B.

FIG. 9 is a block diagram showing the configuration of arithmetic and logic unit B. Arithmetic and logic unit B includes a detector 27 receiving an output signal from multiplexer 25 and detecting the value of output data, and a multiplexer 28 receiving the detection result from detector 27 and instruction code OPC and outputting a flag according to the detection result and instruction code OPC, in addition to the components of arithmetic and logic unit A shown in FIG. 5. Here, detector 27 detects whether or not the operation result being 0, whether or not the operation result being negative, and whether or not there being a carry. In arithmetic and logic unit B, based on input of the right data and the generation number, only a value of pixel number field PX# minus right data R-DATA=5 is selected in multiplexer 25. This value is output from arithmetic and logic unit B as the operation result. Further, the value passes through detector 27, and a value detected therein is selected in multiplexer 28, and provided from arithmetic and logic unit B as the above described flag. The output through the similar path to that of the first embodiment is input to mechanism B through latch F at the next stage.

As described in the first embodiment, instruction code OPC, condition X determining a divisional configuration of generation number GN, generation number GN, and left data L-DATA are further input to mechanism B. Based on the input, generation number GN (to which no operation is carried out) and left data L-DATA (to which no operation is carried out) are output from mechanism B, and these values are synthesized with bits other than generation number GN and data DATA in latch D at the final stage. At this time, data selected from multiplexer 28 among the outputs of arithmetic and logic unit B is applied to latch D without passing through mechanism B. The output of latch D is the output of FP 103b. A packet of node number ND=100, generation number GN=8, data DATA=0, flag L/R=L, and an identification signal for branch (output from multiplexer 28) is sent to QJB 101. Since the third bit from the lowermost bit of node number ND is 1, QJB 101 outputs the packet. It is found from the output packet that an identification signal for branch has been obtained, and it is found from DATA=0 and flag L/R =L that no operation is carried out to input data.

Figure 7B:
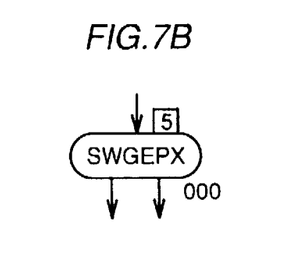

FIG. 7B is a data flow graph of the above described second embodiment. Referring to FIG. 7B, processing is carried out with one node. It is found that the number of nodes is substantially reduced compared to the conventional data flow graph shown in FIG. 16.

In the above embodiment, pixel number field PX# was described. Other than the above embodiment, any combination of field number field FD# and line number field LN# may be used as a field to which operation is carried out. The content of operation includes arithmetic operation, logic operation, bit shift, comparison, and the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data drive type information processor for operating upon received data having a plural-field generation number representing image coordinate information, upon an instruction code, and upon a configuration condition which determines a relative field-size configuration of said generation number, comprising:

taking means for taking data from a first field of said generation number, said first field being designated according to said instruction code and said configuration condition;

operating means for carrying out an operation between said taken data from the first field and operand data; and storing means for storing an operation result by said operating means into the first field of the generation number, whereby the data from said designated first field of said generation number is replaced by said operation result.

2. The information processor according to claim 1, wherein said data having said generation number attached includes first data and second data, and said first data is input to said taking means, and said second data is input to said operating means.

3. The information processor according to claim 1, wherein said generation number includes coordinate information showing positional information for carrying out image processing on a specific pixel, and a plurality of the fields of said coordinate information are prepared.

4. The information processor according to claim 3, wherein said coordinate information is three-dimensional positional data.

5. The information processor according to claim 3, wherein said taking means includes first switching means for selecting a desired field region out of said prepared plurality of field regions according to said configuration condition, and second switching means for receiving an instruction code instructing operation using an output of said first switching means and output data of said first switching means.

6. The information processor according to claim 3, wherein said storing means includes third switching means for selecting a desired field region out of said prepared plurality of field regions according to said configuration condition, and fourth switching means for receiving an output of said third switching means and an operation result of said operating means and outputting data of a prescribed number of bits according to said instruction code.

7. The information processor according to claim 1, wherein said operating means includes branch signal output means for outputting a branch signal to branch the subsequent processing according to said operation result.

8. The information processor according to claim 7, wherein said branch signal output means includes determination signal output means for detecting said operation result and outputting a determination signal indicating that said operation result has been detected and means, responsive to said determination signal, for receiving said operation result and said instruction code and outputting data to said storing means.

9. The information processor according to claim 1, wherein said taking means sets a size of said first field to be one of a plurality of predetermined sizes according to said configuration condition, said configuration condition being variable.

10. The information processor according to claim 9, wherein said taking means is operable to adjust a size of at least a second field of said generation number according to said size of said first field.

11. The information processor according to claim 10, wherein said first field represents a set to which said received data belongs and said second field uniquely identifies said received data within said set;

said set is arranged as an array;

said second field includes a first sub-field and a second sub-field;

said first sub-field identifying a row in which said received data is located within said set; and said second sub-field identifying a column in which said received data is located within said set.

12. The information processor according to claim 1, wherein at least two of said fields provide the image coordinate information, only the first of said fields having data taken by said taking means, and the other fields of the generation number remain in the generation number.

13. The information processor according to claim 1, wherein said generation number includes a field number field, a line number field, and a pixel number field, and further wherein said first field is one of said field number field, said line number field, and said pixel number field.

14. The information processor according to claim 13, wherein data in the others of said field number field, said line number field, and said pixel number field remain in the generation number into which said storing means stores said operation result.

15. The information processor according to claim 3, wherein said coordinate information is only two-dimensional positional data.

16. In a data driven type information processor for operating upon data having a plural-field generation number representing image coordinate information, upon an instruction code, and upon a configuration condition based on which a relative field-size configuration of said generation number is determined, a method for processing data according to data driven protocol comprising:

receiving said instruction code, said configuration condition and said data having said plural-field generation number;

designating a first field of said plural-field generation number according to said instruction code;

taking data from said first field of said generation number;

carrying out an operation according to data driven protocol between said taken-data from said first field of said generation number to produce an operation result; and storing said operation result into said first field of said generation number.

17. The method as in claim 16, further comprising:

setting a size of said first field to be one of a plurality of predetermined sizes according to said configuration condition, said configuration condition being variable.

18. The method as in claim 17, further comprising:

adjusting a size of at least a second field of said generation number according to said size of said first field.

19. The method as in claim 17, wherein said first field represents a set to which said received data belongs and said second field uniquely identifies said received data within said set;

said set is arranged as an array;

said second field includes a first sub-field and a second sub-field;

said first sub-field identifying a row in which said received data is located within said set; and said second sub-field identifying a column in which said received data is located within said set.

20. The method as in claim 16, wherein at least two fields of said generation number provide the image coordinate information, said taking step taking data from only the first of said fields, and the other fields of the generation number remain unprocessed in the generation number.

21. The method as in claim 16, wherein said generation number includes a field number field, a line number field, and a pixel number field, and further wherein said first field is one of said field number field, said line number field, and said pixel number field.

22. The method as in claim 21, wherein data in the others of said field number field, said line number field, and said pixel number field remain in said generation number, and said storing step stores said operation result into said first field of said generation number.

* * * * *